United States Patent [19]
Sucic et al.

[11] Patent Number: 5,598,760
[45] Date of Patent: Feb. 4, 1997

[54] EOP SCRIBE DEVICE

[76] Inventors: Steve Sucic, 335 Bronson Rd., Southport, Conn. 06490; Corey D. Jones, 10 Farmwood Dr., Prospect, Conn. 06712

[21] Appl. No.: 275,557

[22] Filed: Jul. 15, 1994

[51] Int. Cl.$^6$ ..................................... B23P 15/00
[52] U.S. Cl. ................. 83/880; 83/883; 29/889.6
[58] Field of Search ................. 33/18.1, 32.1, 33/32.3, 20.2, 562; 29/889.7, 889.71, 889.72, 889.722, 889.6, 889.61, 407; 83/879, 880, 883

[56] References Cited

U.S. PATENT DOCUMENTS

| | | | |
|---|---|---|---|
| 5,041,182 | 8/1991 | Sekiguchi et al. | 29/889.71 X |
| 5,222,297 | 6/1993 | Graff et al. | 29/889.7 X |
| 5,320,494 | 6/1994 | Reinfelder et al. | 29/889.71 X |
| 5,392,514 | 2/1995 | Cook et al. | 29/889.7 X |

*Primary Examiner*—Rinaldi I. Rada
*Assistant Examiner*—Boyer D. Ashley
*Attorney, Agent, or Firm*—Terrance J. Radke

[57] ABSTRACT

The described embodiment of an edge-of-part (EOP) scribe device is operative to simultaneously scribe opposed trim lines in an oversized, cured leading-edge sheath mounted on a sheath mold assembly. The EOP scribe device includes a primary carriage assembly having rollers secured thereto wherein the primary carriage assembly is translatable along side rails secured to the sheath mold assembly, opposed pairs of guide rails affixed to the primary carriage assembly, and a secondary carriage assembly mounted in movable combination with each pair of guide rails. Each secondary carriage assembly includes a spring-loaded scribe head for inscribing a trim line in the cured leading-edge sheath, a rigid follower linkage secured to the secondary carriage assembly, and a follower slide roller mounted in rotatable combination with the rigid follower linkage and operative to rotatably engage a trim line template mounted on the sheath mold assembly. As the primary carriage assembly is subjected to translation along the sheath mold assembly, dimensional changes in the trim line templates induce vertical displacements in the follower slide rollers, the induced vertical displacements being coupled through the rigid follower linkages to cause corresponding vertical displacements in the secondary carriage assemblies and concomitantly, in the scribe heads. The vertical displacements of the hardened scribe heads matches the respective trim line templates such that the scribed trim lines correspond to the profiles of the finished edges of the prefabricated leading-edge sheath.

12 Claims, 4 Drawing Sheets

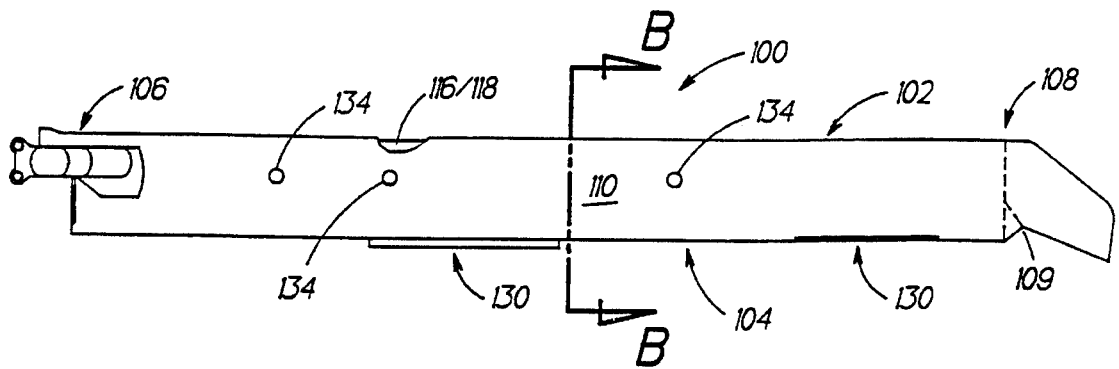
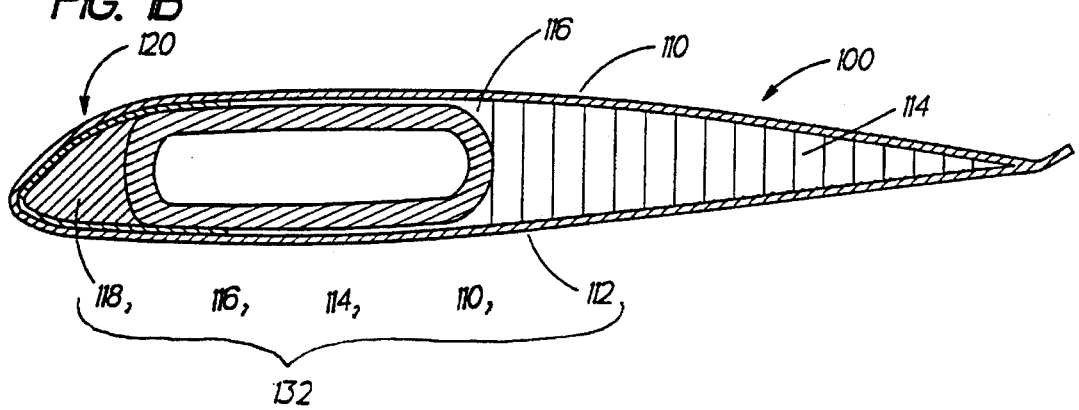
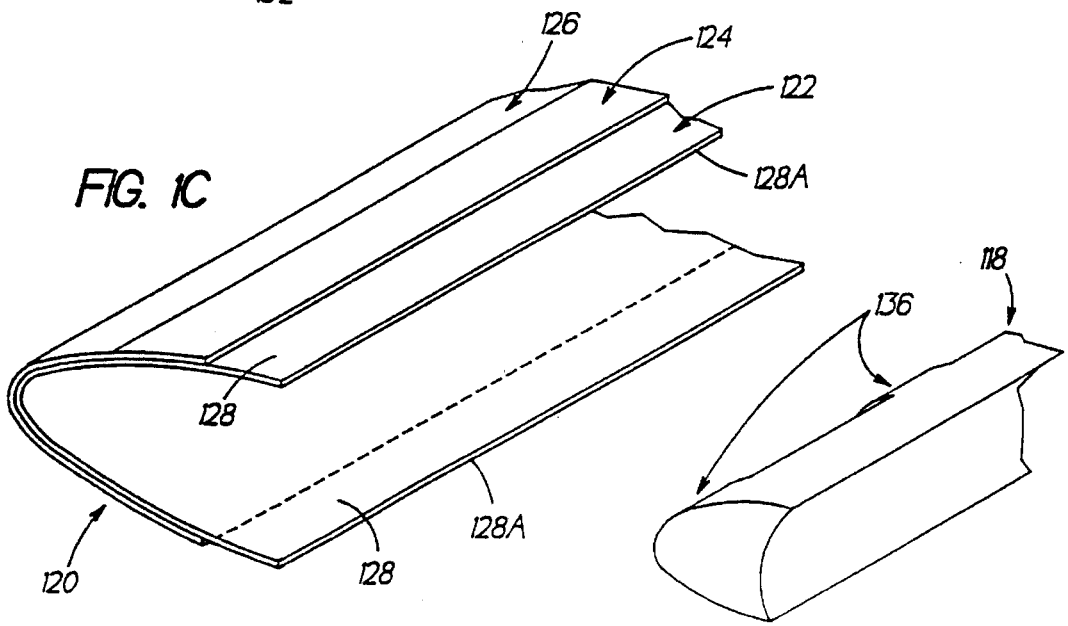

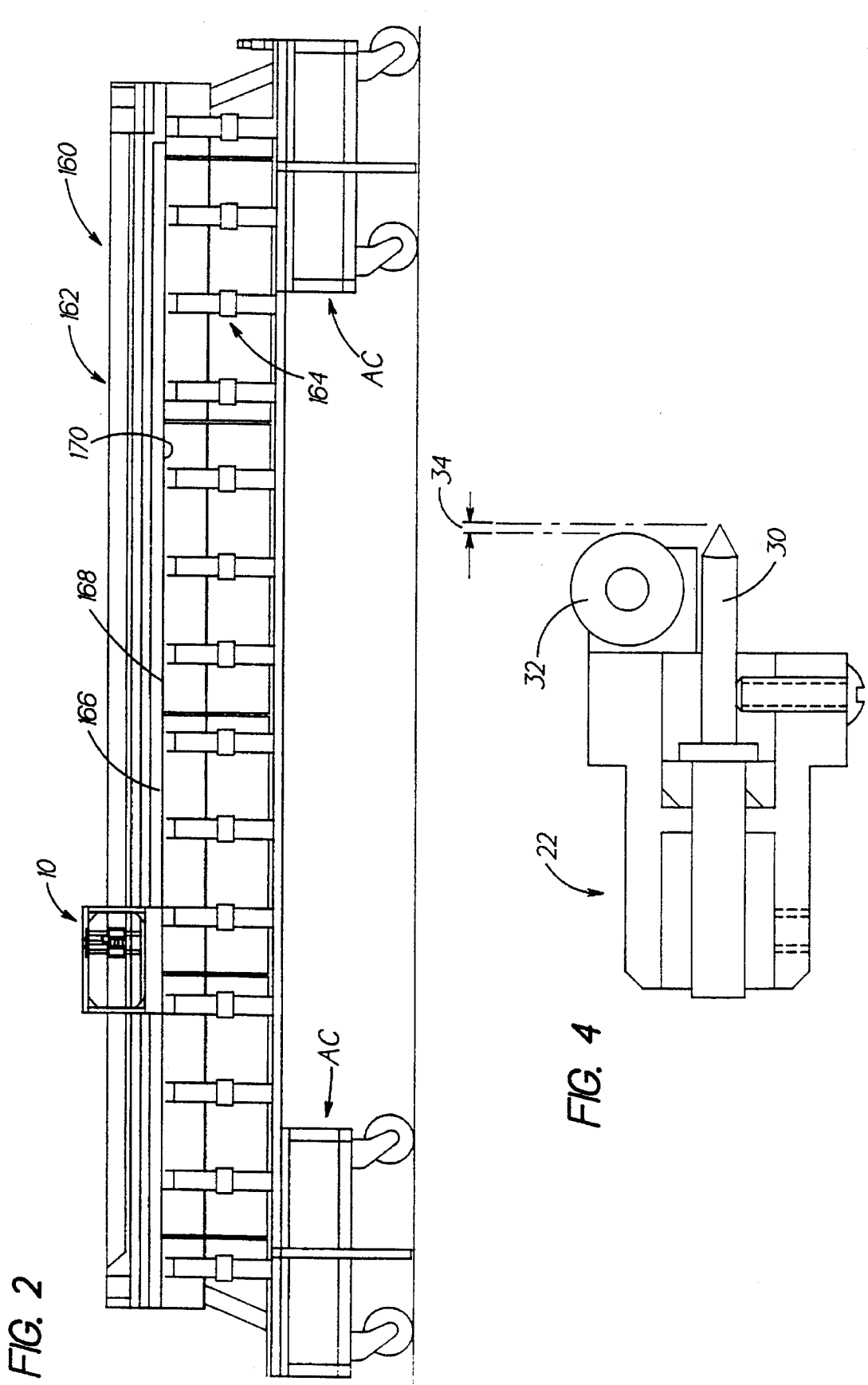

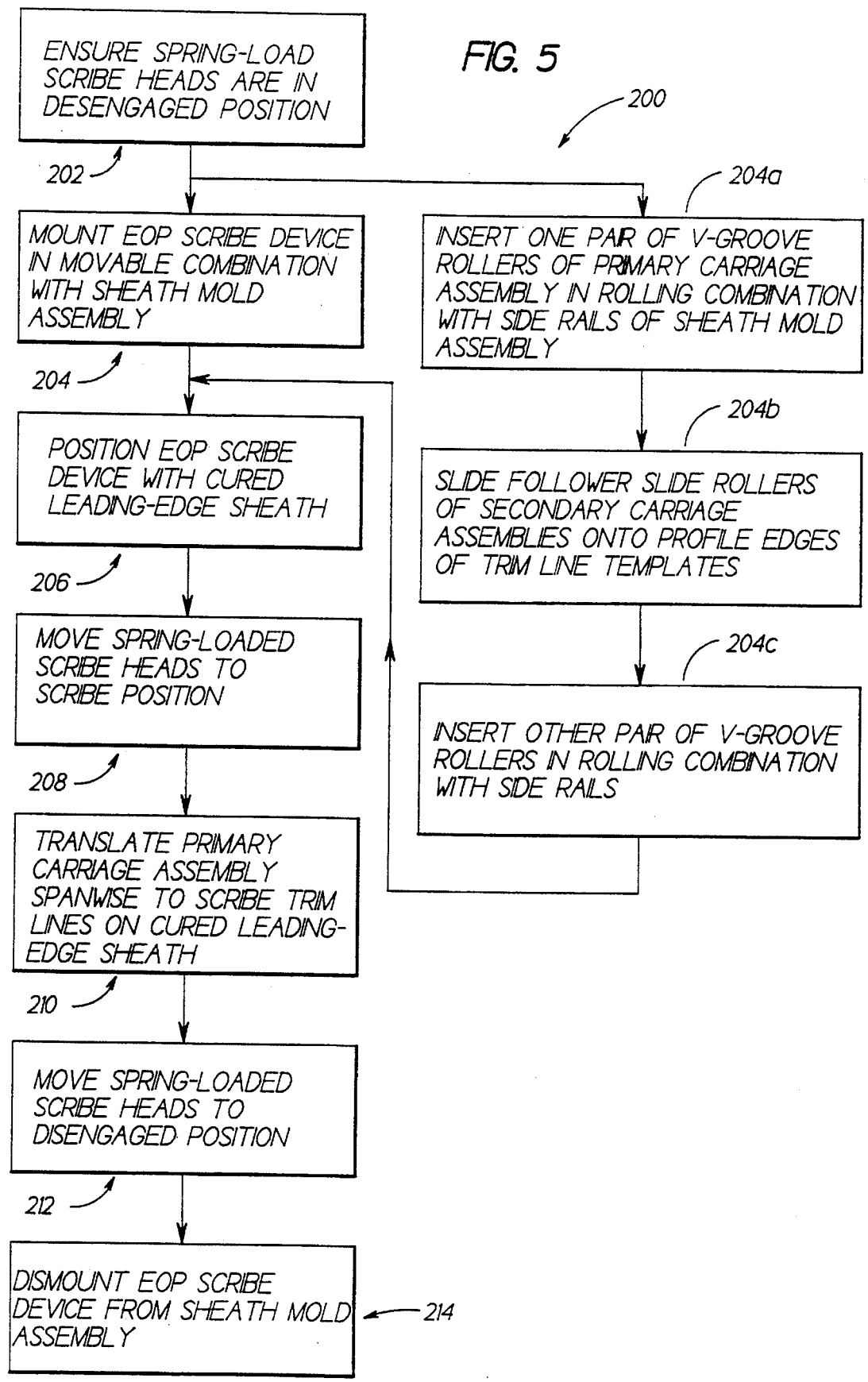

EOP SCRIBE DEVICE

RELATED APPLICATION

The instant application is related to commonly-owned, U.S. patent application Ser. No. 08/275,556, filed 15 Jul. 1994, entitled APPARATUS AND METHODS FOR FABRICATING A HELICOPTER MAIN ROTOR BLADE (issued as U.S. Pat. No. 5,430,937) and divisional applications having Ser. Nos. 08/445,627 and 08/556,758, filed 22 May 1995 and 4 Dec. 1995, respectively.

TECHNICAL FIELD

The present invention is directed to manufacturing apparatus and methods, and more specifically, to an edge-of-part (EOP) scribe device for scribing trim lines that define the finished edges of a cured leading-edge sheath for a helicopter main rotor blade.

BACKGROUND OF THE INVENTION

There is a growing trend in the aerospace industry to expand the use of composite materials for a diverse array of structural and dynamic applications. One particular application for the use of composite materials lies in the fabrication of main rotor blades for helicopters.

With increased usage of composite materials to fabricate main rotor blades, the helicopter industry is continually seeking to improve the tooling and/or methods used to fabricate main rotor blades so as to reduce the per unit fabrication costs associated with the main rotor blades or to improve the tolerances of the fabricated main rotor blades. Per unit fabrication costs may be higher than need be where a particular fabrication protocol involves the use of multiple tools and/or extensive set up times. Or, perhaps even more importantly, per unit fabrication costs, repeatability, and/or blade tolerances may be adversely impacted to greater or lesser degrees to the extent that the fabrication protocol involves manual labor.

Sikorsky Aircraft has developed a parallel manufacturing protocol for fabricating helicopter main rotor blades wherein a blade subassembly and a leading-edge sheath are concurrently fabricated as individual components, and then the prefabricated blade subassembly and the prefabricated leading-edge sheath are integrated in combination to form an assembled main rotor blade. The assembled main rotor blade is subsequently cured to form a finished main rotor blade. This protocol was adopted in large measure because experience has shown that the leading edges of main rotor blades are subjected to varying degrees of abrasion during helicopter operations. As a consequence of such abrasion effects, the leading edge of a helicopter main rotor blade at stone point becomes aerodynamically unsuitable for further use. Rather than replacing the entire main rotor blade, it was determined that a replaceable leading-edge sheath would allow abrasion-degraded main rotor blades to be efficaciously and economically repaired.

The manufacturing protocol for fabricating the prefabricated leading-edge sheath involves a fabrication procedure wherein a cured leading-edge sheath having an oversized configuration is formed in a conventional composite molding process, i.e., assemblage of the components of the leading-edge sheath on a sheath mold assembly and subsequent curing to form the cured leading-edge sheath. By forming the cured leading-edge sheath in an oversized configuration, the assemblage process is greatly simplified since the lay-up tolerances of the composite material incorporated in the leading-edge sheath need not be layed-up to precise tolerances. In addition, the finished edges of the prefabricated leading-edge sheath have a relatively complex span wise profile to accommodate the asymmetric spanwise twisting and chordwise displacements of the main rotor blade. The tolerances of the finished edges must be closely maintained to ensure that the prefabricated leading-edge sheath may be properly integrated in combination with the blade subassembly to form the main rotor blade. Forming the finished edges in the composite plies that are part of the leading-edge sheath prior to the assemblage procedure increases the risk that the precise tolerance of the finished edges will not be maintained during subsequent curing and/or handling of the leading-edge sheath.

The oversized configuration of the cured leading-edge sheath requires that the cured leading-edge sheath be further worked to form the finished edges thereof. The prior art procedure for forming the finished edges in the cured leading-edge sheath involves the scribing or marking of trim lines in the cured leading-edge sheath, the scribed trim lines defining the profiles of the finished edges of the prefabricated leading-edge sheath. To scribe the trim lines, the oversized, cured leading-edge sheath is removed from the sheath mold assembly and a trim bonnet having a V-shaped, latticed configuration corresponding to the cured leading-edge sheath is overlayed in aligned combination with and secured to the oversized, cured leading-edge sheath. The opposed edges of the trim bonnet define the profiles of the finished edges of the prefabricated leading-edge sheath. An operator moves a scriber against each opposed edge to scribe the trim lines in the oversized, cured leading-edge sheath. Once the trim lines are scribed, the trim bonnet is disengaged from the oversized, cured leading-edge sheath and removed therefrom, and the oversized, cured leading-edge sheath is cut along the scribed trim lines to form the prefabricated leading-edge sheath.

The prior art procedure for scribing the trim lines in the oversized, cured leading-edge sheath is disadvantageous in being heavily labor intensive. This increases the probability that the trim lines may be improperly scribed, for example due to a misalignment in securing the trim bonnet to the oversized, cured leading-edge sheath, or due to human error during physical scribing of the sheath. Further, the scribing procedure is time consuming inasmuch as the oversized, cured leading-edge sheath must be removed from the sheath mold assembly, the trim bonnet must be manually overlayed and secured in combination with the oversized, cured leading-edge sheath, the scribing procedure is effectuated manually, and the trim bonnet must be manually disengaged and removed from the oversized, cured leading-edge sheath. Moreover, continued handling of the trim bonnet increases the risk that the profiled edges thereof will be inadvertently damaged or the tolerances thereof lost, leading to improperly scribed trim lines.

A need exists to provide an apparatus and procedure that minimizes the human involvement in scribing trim lines in an oversized, cured leading-edge sheath. The apparatus should simplify the set up procedures for use of the apparatus. The apparatus should provide increased accuracy and repeatability in scribing trim lines in cured leading-edge sheaths. The apparatus should be configured to simultaneously scribe trim lines on both sides of the cured leading-edge sheath.

SUMMARY OF THE INVENTION

One object of the present invention is to provide an edge-of-part (EOP) scribe device that minimizes human involvement in scribing trim lines in an oversized, cured leading-edge sheath.

Another object of the present invention is to provide an EOP scribe device that is configured to simultaneously scribe trim lines on both sides of an oversized, cured leading-edge sheath.

A further object of the present invention is to provide an EOP scribe device that is relatively simple to set up for scribing trim lines in an oversized, cured leading-edge sheath.

Yet another object of the present invention is to provide an EOP scribe device that provides increased accuracy and repeatability in scribing trim lines in oversized, cured leading-edge sheaths.

These and other objects of the present invention are achieved by an EOP scribe device according to the present invention that is operative for simultaneously scribing trim lines in an oversized, cured leading-edge sheath mounted on a sheath mold assembly. The EOP scribe device comprises a primary carriage assembly mounted in movable combination with the sheath mold assembly, opposed pairs of guide rails affixed in combination with the primary carriage assembly, and a secondary carriage assembly mounted in movable combination with each pair of guide rails. Each secondary carriage assembly includes a spring-loaded scribe head mounted in combination with the secondary carriage assembly, and having a hardened scriber rigidly affixed in combination therewith. Means are provided for inducing vertical displacements in said secondary carriage assemblies that correspond to the profiles of the finished edges of a prefabricated leading-edge sheath. The hardened scribers are operative to scribe trim lines in the oversized, cured leading-edge sheath as a result of spanwise translation of the primary carriage assembly along the sheath mold assembly, the scribed trim lines corresponding to the profiles of the finished edges of the prefabricated leading-edge sheath.

For the described embodiment of the EOP scribe device, the vertical displacement inducing means comprises a rigid follower linkage affixed in combination with each secondary carriage assembly, a follower slide roller rotatably mounted in combination with the rigid follow linkage, and a profile means rotatably engaging each follower slide roller for inducing vertical displacements therein corresponding to the profiles of the finished edges of the prefabricated leading-edge sheath. The profile means preferably comprises trim line templates affixed in combination with the sheath mold assembly on opposed sides thereof. The trim line templates have profiled edges that define the profiles of the finished edges of the prefabricated leading-edge sheath. The follower slide rollers rotatably engage the profiled edges of the trim line templates such that dimensional changes in the profiled edges during the spanwise translation of the primary carriage assembly along the sheath mold assembly induce corresponding vertical displacements in the follower slide rollers.

Each spring-loaded scribe head of the described embodiment of the EOP scribe device of claim 1 is mounted in combination with said secondary carriage assembly for transverse movement with respect thereto. Each secondary carriage assembly further comprises a positioning knob secured in rigid combination with the spring-loaded scribe head. The positioning knob is operative to move the spring-loaded scribe head between a disengaged position for mounting the primary carriage assembly in movable combination with the sheath mold assembly and a scribe position wherein the hardened scriber affixed in combination with the spring-loaded scribe head is operative to scribe the trim line in the oversized, cured leading-edge sheath. The spring-loaded scribe head may further include a tolerance roller rotatably mounted in combination with the spring-loaded scribe head. The tolerance roller is operative to rotatably engage the oversized, cured leading-edge sheath during the spanwise translation of the primary carriage assembly along the sheath mold assembly to maintain a constant depth for the scribed trim line.

The described embodiment of the EOP scribe device further includes V-groove rollers affixed in combination with the primary carriage assembly and interactively operative in combination with the sheath mold assembly to facilitate the spanwise translation of the primary carriage assembly along the sheath mold assembly. The EOP scribe device may also include a plurality of handles affixed in combination with said primary carriage assembly for mounting the primary carriage assembly in combination with the sheath mold assembly and for dismounting the primary carriage assembly from the sheath mold assembly.

BRIEF DESCRIPTION OF THE DRAWINGS

A more complete understanding of the present invention and the attendant features and advantages thereof may be had by reference to the following detailed description when considered in conjunction with the following drawings wherein:

FIG. 1A is a top plan view of an exemplary main rotor blade for an H-60 helicopter.

FIG. 1B is a cross-sectional view of the main rotor blade of FIG. 1A taken along line 1B—1B thereof.

FIG. 1C is an enlarged partial perspective view of the leading edge sheath illustrated in FIG. 1B.

FIG. 1D is an enlarged partial perspective view of a counterweight for the exemplary main rotor blade of FIG. 1A.

FIG. 2 is a side plan view of an edge-of-part (EOP) scribe device according to the present invention mounted in operative combination with a sheath mold assembly.

FIG. 4 is a top plan view of a scribe head of the EOP scribe device of FIGS. 3A, 3B.

FIG. 5 is a flow chart illustrating a method of operating the EOP scribe device according to the present invention.

BEST MODE FOR CARRYING OUT THE INVENTION

Figure 3A:
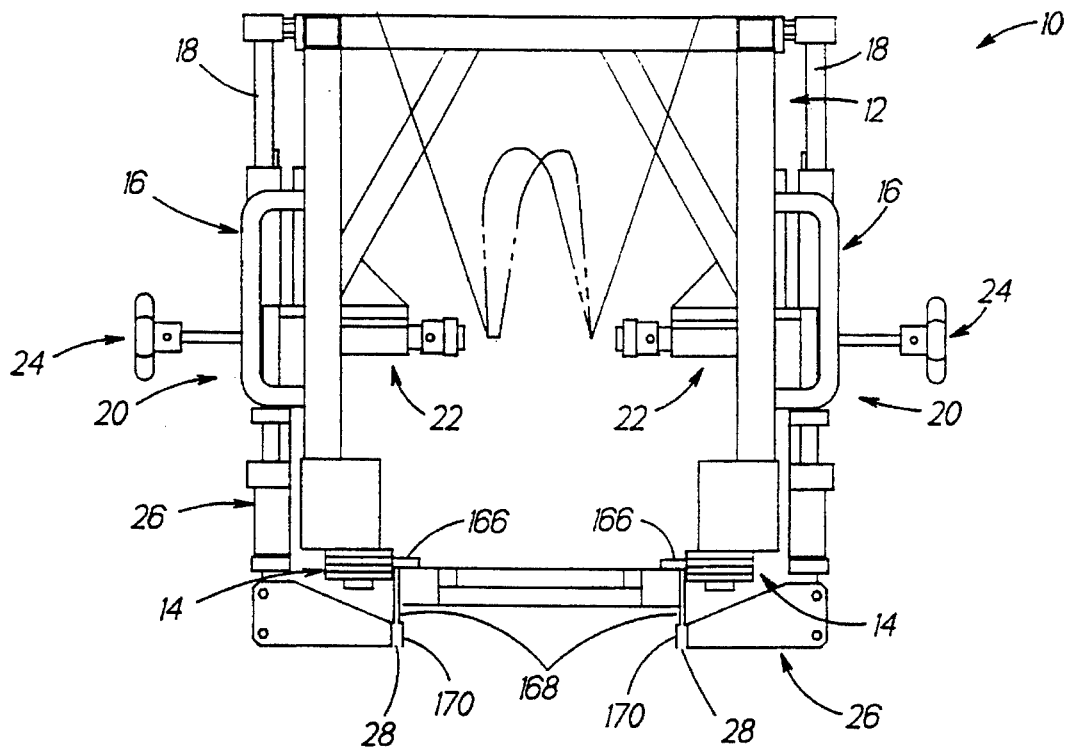
FIG. 3A is an end plan view of the EOP scribe device of FIG. 2.

The device described in further detail hereinbelow comprises part of the manufacturing apparatus for fabricating main rotor blades for H-60 helicopters manufactured by Sikorsky Aircraft Corporation's subsidiary of United Technologies Corporation. In particular, the device described herein has particular utility in the fabrication protocol of the H-60 growth main rotor blade developed by Sikorsky Aircraft. It will be appreciated, however, that the device described herein has applicability in fabricating main rotor blades in general.

An H-60 growth main rotor blade 100 is exemplarily illustrated in FIGS. 1A–1D, and includes a leading edge 102 and a trailing edge 104, which in combination define the chord of the rotor blade 100, and an inboard end 106 and an outboard (tip) end 108 (an anhedral tip portion of the main rotor blade 100, which is the portion of the blade outboard of the dashed line 109 in FIG. 1A, is separately fabricated as a replaceable component for the main rotor blade 100), which in combination define the span of the rotor blade 100. The main rotor blade 100 comprises upper and lower composite skins 110, 112 that define the upper and lower aerodynamic surfaces of the blade 100, respectively, a honeycomb core 114, a spar 116, a plurality of counterweights 118, and a leading-edge sheath 120. Adjustable trim tabs 130 (two for the illustrated embodiment) extend rearwardly from the trailing edge 104. The upper and lower composite skins 110, 112, the honeycomb core 114, the spar 116, and the counterweights 118 in combination define a blade subassembly 132.

The composite skins 110, 112 are prefabricated components formed from several plies of prepreg composite material of a type know to those skilled in the art, e.g., for the described embodiment woven fiberglass material embedded in a suitable resin matrix. The upper composite skin 110 has a plurality of locator apertures 134 (see FIG. 1A) formed therethrough to facilitate lay-up of the spar member 116 in a compaction fixture as described in further detail hereinbelow. After the main rotor blade 100 has been assembled, the locator apertures 134 are patched with composite material so that the upper composite skin 110 has an aerodynamically smooth surface. The honeycomb core 114 is fabricated of material type typically used in aerospace applications, e.g., for the described embodiment NOMEX® (NOMEX is a registered trademark of E. I. du Pont de Nemours & Co., Wilmington, Del. for aramid fibers or fabrics) and functions as a low weight, structural stiffening member between the upper and lower composite skins 110, 112.

The spar 116 is a prefabricated component and functions as the primary structural member of the main rotor blade 100, reacting the torsional, bending, shear, and centrifugal dynamic loads developed in the rotor blade 100 during operation of the helicopter. The spar 116 of the described embodiment is a composite spar of the type disclosed and claimed in commonly-owned, co-pending U.S. patent application Ser. No. 07/995,219 filed 22 Dec. 1992 entitled FIBER REINFORCED COMPOSITE SPAR FOR A ROTARY WING AIRCRAFT. The composite spar 116 comprises upper and lower side walls corresponding to upper and lower airfoil surfaces, respectively, and forward and aft conic closures corresponding to leading and trailing edges, respectively, of the main rotor blade 100. The upper and lower side walls comprise a plurality of pre-ply layers, each pre-ply layer including unipack plies and cross plies of prepreg composite material, i.e., fibrous material embedded in a resin matrix. The unipack plies, which have longitudinally (axial) orientated fibers, are of equal width and staggered to provide a tapered edge with the upper and lower side walls. The cross plies, which have ±40° orientated fibers, have varying widths that form a staggered butt joint about the periphery of the forward and aft conic closures. While the described embodiment of the main rotor blade 100 incorporates a composite spar 116, one skilled in the art will appreciate that the apparatus and methods of the present invention may also be utilized in manufacturing main rotor blades wherein the spar is fabricated as a metallic structural member, e.g., a titanium spar.

One or more counterweights 118, one of which is illustrated in further detail in FIG. 1D, are utilized to statically and dynamically balance the main rotor blade 100. The counterweights 118 are fabricated from less dense to more dense materials, e.g., foam, tungsten, and lead, respectively, for the described embodiment, in the spanwise direction from the inboard end 106 to the outboard end 108 to provide the necessary weight distribution for statically and dynamically balancing the rotor blade 100. The counterweights 118 are fabricated to include hardpoints 136 that provide the physical engagement between the counterweights 118 and the inner mold line (IML) surface of the leading edge sheath 120. The counterweights 118 are adhesively bonded to the spar 116 to form a spar assembly 116/118 wherein the bonded counterweights 118 are in an interposed position between the leading edge sheath 120 and the leading edge of the spar 116.

An apparatus and method for assembling the upper and lower composite skins 110, 112, the honeycomb core 114, the spar 116, and the counterweights 118 to form the blade subassembly 132 is described in further detail in commonly-owned U.S. patent application Ser. No. 08/275,556, filed 15 Jul. 1994 entitled APPARATUS AND METHODS FOR FABRICATING A HELICOPTER MAIN ROTOR BLADE (issued as U.S. Pat. No. 5,430,937). This application also describes an apparatus and method of installing the fabricated leading-edge sheath 120 in combination with the blade subassembly 132 to form an assembled main rotor blade 100.

The leading edge sheath 120, which is illustrated in greater detail in FIG. 1C, is a prefabricated hybrid component fabricated from composite materials and abrasion-resistive materials. The sheath 120 has a generally V-shaped configuration that defines the leading edge 102 of the main rotor blade 100. The sheath 120 comprises one or more plies 122 of prepreg composite material, e.g., woven fiberglass material embedded in a suitable resin matrix for the described embodiment, that define the inner mold line (IML) surface of the leading edge sheath 120, a first abrasion strip 124, and a second abrasion strip 126. For the described embodiment, the first abrasion strip 124 is fabricated from titanium and the second abrasion strip 126 is fabricated from nickel. The tip end 108, i.e., outboard end, of the leading edge sheath 120 has nickel strip 126 bonded to the titanium strip 124 as illustrated in FIG. 1C. The titanium strip 124 with the nickel strip 126 overlay is adhesively bonded to the prepreg composite plies 122 to form the leading-edge sheath 120. Exposed segments 128 of the prepreg composite plies 122 facilitate adhesive bonding of the leading edge sheath 120 in combination with the blade subassembly 132. The exposed segments 128 include finished edges 128A that are formed to define the proper integration of the leading-edge sheath 120 in combination with blade subassembly 132 as described in further detail in commonly-owned, U.S. patent application Ser. No. 08/275,556, filed 15 Jul. 1994 entitled APPARATUS AND METHODS FOR FABRICATING A HELICOPTER MAIN ROTOR BLADE (issued as U.S. Pat. No. 5,430,937). The leading edge sheath 120 is removable to facilitate replacement thereof. The leading edge sheath 120, and in particular the titanium strip 124 and the nickel strip overlay 126, provides abrasion protection for the leading edge 102 of the main rotor blade 100. The leading edge sheath 120 also provides control of airfoil tolerances of the main rotor blade 100.

FIG. 2 illustrates an edge-of-part (EOP) scribe device 10 according to the present invention mounted in operative combination with a sheath mold assembly 160. The sheath mold assembly 160 is utilized to fabricate the leading-edge sheath 120 described in the preceding paragraph. The sheath mold assembly 160 includes a male molding surface 162 and a support structure 164. The male molding surface 162 has a surface configuration that defines the IML surface of the leading-edge sheath 120. The molding surface 162 is mounted on the support structure 164 to facilitate assemblage of the leading-edge sheath 120 as described in the following paragraph. Also illustrated in FIG. 2 are a pair of autoclave carts AC that are utilized to support the sheath mold assembly 160 for transport thereof into and out of an autoclave (not illustrated).

The fabrication protocol for the prefabricated leading-edge sheath 120 described hereinabove involves the following steps. The prepreg composite plies 122 are layed-up on the male molding surface 162. The prepreg composite plies 122 are oversized to facilitate the lay-up thereof by minimizing the tolerance requirements that need to be maintained for the ply lay-ups. Prior to lay-up, the first abrasion strip 124 (titanium for the described embodiment) and the second abrasion strip 126 (nickel for the described embodiment) are preformed to conform to the configuration of the male molding surface 162 by a conventional forming technique of the type known to those skilled in the art. The preformed nickel strip 126 is bonded to the preformed titanium strip 124, e.g., for the described embodiment to the outboard portion of the titanium strip 124, to form the titanium strip 124 and the nickel strip 126 overlay. A suitable adhesive is applied to the layed-up prepreg composite plies (122), or alternatively to the titanium strip 124 and the nickel strip 126 overlay, and then the preformed titanium strip 124 (with the nickel strip 126 overlay) is overlayed in combination with the layed-up prepreg composite plies 122 to form a leading-edge sheath preform on the male molding surface 162. The leading-edge sheath preform is vacuum-bagged and the layed-up sheath mold assembly 160 is inserted in the autoclave by means of the autoclave carts AC wherein the leading-edge sheath preform is subjected to a pressure/temperature cure process.

Upon completion of the cure process, the cured leading-edge sheath 120 is removed from the autoclave. The cured leadlug-edge sheath 120 is oversized, i.e., the exposed segments 128 thereof, in light of the use of oversized prepreg composite plies 122 in the lay-up procedure. The EOP scribe device 10 according to the present invention is operative to scribe or mark the exposed segments 128 of the cured leading-edge sheath 120 with trim lines flat define the finished edges 128A of the prefabricated leading-edge sheath 120. The EOP scribe device 10 according to the present invention is particularly advantageous inasmuch as the EOP scribe device 10 is configured for use in combination with the sheath mold assembly 160, i.e., the EOP scribe device 10 is operative to scribe trim lines on the cured leading-edge sheath 120 with the cured leading-edge sheath 120 mounted on the sheath mold assembly 160. Furthermore, the EOP scribe device 10 according to the present invention minimizes the number of tools required to form trim lines on the cured leading-edge sheath 120, reduces the set-up time, and provides increased accuracy and enhanced repeatability in the trim lines scribed on the cured leading-edge sheath 120. In addition to the foregoing advantages, the EOP scribe device 10 according to the present invention is operatively configured to scribe trim lines in both exposed segments 128 of the cured leading-edge sheath 10 simultaneously, thereby reducing the time required to scribe such trim lines.

The sheath mold assembly 160 described hereinabove is modified to accommodate mounting of the EOP scribe device 10 is combination therewith. More particularly, opposed side rails 166 are secured in combination with the support structure 164 of the sheath mold assembly 160 (see also FIG. 3A). The opposed side rails 166 are operative to allow the EOP scribe device 10 to be translated along the span of the cured leading-edge sheath 120 mounted on the sheath mold assembly 160. Affixed in combination with each side rail 166 is a trim line template 168. The profile edge 170 of each trim line template 168 is configured to define the profile of the respective finished edge 128A of the prefabricated leading-edge sheath 120, i.e., defines the respective trim line to be scribed by the EOP scribe device 10 onto the exposed segment 128 of the cured leading-edge sheath 120. The profile of each profile edge 170 is preferably formed by numerical-controlled machining to provide precise conformance between the profiled edges 170 and the finished edges 128A required on the prefabricated leading-edge sheath 120.

Figure 3B:
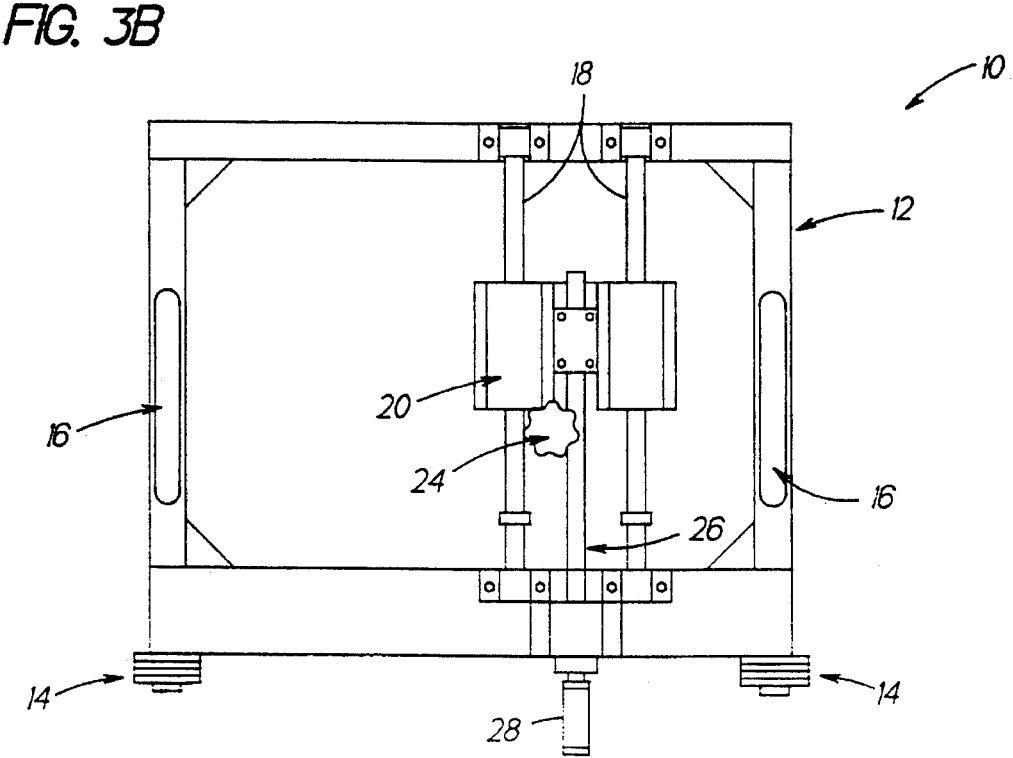
FIG. 3B is a side plan view of the EOP scribe device of FIG. 2.

With reference to FIGS. 3A, 3B, the EOP scribe device 10 according to the present invention comprises a primary carriage assembly 12, V-groove rollers 14, handles 16, opposed pairs of guide rails 18, and a pair of secondary carriage assemblies 20 in opposed relation. The V-groove rollers 14 are affixed in combination with the primary carriage assembly 12 as illustrated. The V-groove rollers 14 have a configuration that is complementary to the side rails 166 of the sheath mold assembly 160, and in interactive combination with the side rails 166, provide the means for translating the primary carriage assembly 12 along the span of the cured leading-edge sheath 120 mounted on the sheath mold assembly 160. The handles 16 are affixed in combination with the primary carriage assembly 12, and provide the means for mounting the EOP scribe device 10 in combination with the side rails 166 or dismounting the EOP scribe device 10 from the side rails 166.

A pair of guide rails 18 is affixed, e.g., by bolted brackets, in combination with respective opposed sides of the primary carriage assembly 12 so that the affixed pairs of guide rails 18 have an opposed relationship. One secondary carriage assembly 20 is mounted in slidable combination with each pair of guide rails 18. The guide rails 18 are operative to constrain the sliding movement of the respective secondary carriage assembly 20 to vertical displacements with respect to the cured leading-edge sheath 120 mounted on the sheath mold assembly 160.

Each secondary carriage assembly 20 includes a spring-loaded scribe head 22 (see FIG. 4), a positioning knob 24, a rigid follower linkage 26, and a follower slide roller 28. The spring-loaded scribe head 22 is mounted in movable combination with the secondary carriage assembly 20, i.e., for transverse movement with respect thereto. The positioning knob 24 is secured in rigid combination with the scribe head 22 and is operative to move the spring-loaded scribe head 22 between a disengaged position and a scribe position. The positioning knob 24 is movable outwardly from the secondary carriage assembly 20 (causing a concomitant outward movement, i.e., retraction, of the spring-loaded scribe head 22), and is rotatable in a first direction to lock the spring-loaded scribe head 22 in the disengaged position. The disengaged position of the spring-loaded scribe head 22 facilitates mounting of the primary carriage assembly 12 in movable combination with the sheath mold assembly 160 without contact between the spring-loaded scribe heads 22 and the cured leading-edge sheath 120. Rotation of the positioning knob 24 in the opposite direction unlocks the spring-loaded scribe head 22. Once the spring-loaded scribe head 22 is unlocked, the spring-loading thereof is operative to bias the spring-loaded scribe head 22 to the scribe position. In the scribe position, the spring-loaded scribe head 22 is operative to scribe the trim line in the respective exposed segment 128 of the cured leading-edge sheath 120 as the primary carriage assembly 12 is translated in the spanwise direction along the side rails 166 of the sheath mold assembly 160.

The rigid follower linkage 26 is rigidly affixed in combination with the secondary carriage assembly 20, e.g., by bolted connections. The follower slide roller 28 is rotatably mounted in combination with the rigid follower linkage 26 as illustrated in FIGS. 3A, 3B. With the primary carriage assembly 12 mounted on the side rails 166, the follower slide roller 28 of each secondary carriage assembly 20 rotatably engages the corresponding profile edge 170 of the respective trim line template 168. Translation of the primary carriage assembly 12 along the span of the cured leading-edge sheath 120 causes the follower slide rollers 28 to rotatably track the corresponding profile edges 170 of the respective trim line templates 168. That is, as the primary carriage assembly 12 translates, changes in the profile of the respective edges 170 induce vertical displacements in the corresponding follower slide rollers 28. Due to the rigidity of the rigid follower linkages 26, vertical displacements induced in the corresponding follower slide rollers 28 cause synchronous vertical displacements of the respective secondary carriage assemblies 20 along the corresponding guide rails 18, i.e., synchronous vertical displacements of the respective spring-loaded scribe heads 22. Such induced vertical displacements correspond to the profiles of the finished edges 128A of the prefabricated leading-edge sheath 120.

While the operative interaction between the follower slide rollers 28, the rigid follower linkages 26, and the profiled edges 170 of the trim line templates 168 is deemed to be the most expeditious and inexpensive way of scribing trim lines in the exposed segments 128 of the cured leading-edge sheath 120, one skilled in the art will appreciate that other means may be utilized to scribe the trim lines that define the profiles of the finished edges 128A of the prefabricated leading-edge sheath 120. For example, a piston assembly or other equivalent functional device may be operatively interconnected to each secondary carriage assembly 20 to induce vertical displacements corresponding to the profiles of the finished edges 128A of the prefabricated leading-edge sheath 120. A computer having the profiles of the finished edges 128 stored in memory thereof would be interconnected to the piston assemblies and operative to induce the requisite vertical displacements in the secondary carriage assemblies 20 such that the scribed trim lines correspond to the profiles of the finished edges 128A.

The spring-loaded scribe head 22 is illustrated in greater detail in FIG. 4 and includes a hardened scriber 30 and a tolerance roller 32. The hardened scriber 30 is rigidly affixed in combination with the spring-loaded scribe head 22. Due to the spring loading exerted by the spring-loaded scribe head 22 in the scribe position, the hardened scriber 30 is continually biased into the prepreg composite plies 122 of the exposed segment 128 of the cured leading-edge sheath 120 with sufficient force to scribe the trim line therein. The scribed trim lines generated by the spring-loaded scribe heads 22 define the profiles of the finished edges 128A of the prefabricated leading-edge sheath 120. The tolerance roller 32 is rotatably mounted in combination with the spring-loaded scribe head 22. The tolerance roller 32 rotatably engages the prepreg composite plies 122 of the corresponding exposed segment 128 as the primary carriage assembly 12 translates along the span of the cured leading-edge sheath 120 and is operative to precisely define and maintain constant the depth of the trim line scribed by the hardened scriber 30. The orthogonal distance between tangent lines extending from the tip of the hardened scriber 30 and the periphery of the tolerance roller 32 in rotating engagement with the prepreg composite plies 122 defines the trim line depth 34. For the embodiment of the EOP scribe device 10 which is described herein and which is utilized to scribe trim lines in the cured leading-edge sheath 120 for the growth main rotor blade 100, the trim line depth 34 is about 0.020 inches. The tolerance roller 32 may be repositioned on the spring-loaded scribe head 22 to vary the depth 34 of the trim line scribed by the hardened scriber 30.

A method 200 of operating the EOP scribe device 10 of the present invention is schematically illustrated in FIG. 5 and comprises the following steps. In initial step 202, the EOP scribe device 10 is examined to verify that the opposed spring-loaded scribe heads 22 are in the disengaged position so that the EOP scribe device 10 may be mounted in combination with the sheath mold assembly 160. Since the next to last step of the method 200 involves retraction of the spring-loaded scribe heads 22 to the disengaged position, the EOP scribe device 10 should normally be configured for mounting in combination with the sheath mold assembly 160. If the spring-loaded scribe heads 22 are in the scribe position, the positioner knobs 24 are pulled outwardly and rotated in the first direction to retract and lock the spring-loaded scribe leads 22 in the disengaged position. In step 204, the EOP scribe device 10 is mounted in combination with the sheath mold assembly 160 by lifting the EOP scribe device 10 by the handles 16 and inserting the one pair of V-groove rollers 14 in rolling combination with the side rails 166 in step 204a, sliding the follower slide rollers 28 onto the profile edges 170 of the respective trim line templates 168 in step 204b, and then inserting the other pair of V-groove rollers 14 in rolling combination with the side rails 166 in step 204c.

The primary carriage assembly 12 is translated along the side rails 166 in step 206 until the hardened scribers 30 are properly positioned with respect to the exposed segments 128 of the leading-edge sheath 120 mounted on the sheath mold assembly 160. In step 208, the positioning knobs 24 are rotated in the opposite direction to unlock the spring-loaded scribe leads 22, which are biased into the scribe position due to the spring loading thereof so that the hardened scribers 30 initiate the respective trim lines in the exposed segments 128. The primary carriage assembly 12 is then translated along the side rails 166 in step 210 to scribe trim lines in the exposed segments 128, the hardened scribers 30 operating as described hereinabove to scribe the respective trim lines in the exposed segments 128 over the span thereof.

Once the trim lines have been scribed in the exposed segments 1.28, the positioning knobs 24 are retracted to move the spring-loaded scribe heads 22 to the disengaged position and then rotated in the first direction to lock the spring-loaded scribe heads 22 in the disengaged position in step 212. Finally, the EOP scribe device 10 is dismounted from the sheath mold assembly 160 in step 214 by translating the primary carriage assembly 12 until the respective pairs of V-groove rollers 14 are disengaged from the side rails 166.

After the cured leading-edge sheath 120 has been scribed with trim lines as described hereinabove, the scribed, cured-leading edge sheath 120 is removed from the sheath mold assembly 160. The scribed, cured leading-edge sheath 120 is then cut along the scribed trim lines by a conventional means/technique to form the prefabricated leading-edge sheath 120 that is spread and inserted onto the blade subassembly 132 (see commonly-owned, U.S. patent application Ser. No. 08/275,556, filed 15 Jul. 1994 entitled APPARATUS AND METHODS FOR FABRICATING A HELICOPTER MAIN ROTOR BLADE (issued as U.S. Pat. No. 5,430,937).

A variety of modifications and variations of the above-described device and method of operation thereof are possible in light of the above teachings. It is therefore to be understood that, within the scope of the appended claims, the present invention may be practiced otherwise than as specifically described herein.

What is claimed is:

1. An edge-of-part (EOP) scribe device for scribing trim lines in exposed segments of an oversized, cured leading-edge sheath mounted on a sheath mold assembly wherein the scribed trim lines correspond to profiles of finished edges of a prefabricated leading-edge sheath, comprising:

a primary carriage assembly mounted in movable combination with the sheath mold assembly;

opposed pairs of guide rails affixed in combination with said primary carriage assembly;

a secondary carriage assembly mounted in movable combination with each said pair of guide rails, each said secondary carriage assembly including a spring-loaded scribe head mounted in combination with said secondary carriage assembly, said spring-loaded scribe head including a hardened scriber rigidly affixed in combination therewith, and means for inducing vertical displacements in said secondary carriage assembly that correspond to the profile of one finished edge of the prefabricated leading-edge sheath;

said hardened scribers being operative to scribe trim lines in the exposed segments of the oversized, cured leading-edge sheath as a result of spanwise translation of said primary carriage assembly along the sheath mold assembly, the scribed trim lines corresponding to the profiles of the finished edges of the prefabricated leading-edge sheath.

2. The EOP scribe device of claim 1 wherein said vertical displacement inducing means comprises:

a rigid follower linkage affixed in combination with said secondary carriage assembly;

a follower slide roller rotatably mounted in combination with said rigid follow linkage; and profile means disposed in combination with the sheath mold assembly for defining the profile of the one finished edge of the prefabricated leading-edge sheath; and wherein said follower slide roller rotatably engages said profile means and is operative, during spanwise translation of said primary carriage assembly, to rotatably track said profile means wherein dimensional changes in said profile means induce vertical displacements in said follower slide roller to cause synchronous vertical displacements in said secondary carriage assembly that correspond to the profile of the one finished edge of the prefabricated leading-edge sheath.

3. The EOP scribe device of claim 2 wherein said profile means comprises trim line templates affixed in combination with the sheath mold assembly on opposed sides thereof, said trim line templates having profiled edges that define the profiles of the finished edges of the prefabricated leading-edge sheath, and wherein said follower slide rollers rotatably engage said profiled edges of said trim line templates such that dimensional changes in said profiled edges during the spanwise translation of said primary carriage assembly along the sheath mold assembly induce corresponding vertical displacements in said follower slide rollers.

4. The EOP scribe device of claim 1 wherein each said spring-loaded scribe head is mounted in combination with said secondary carriage assembly for transverse movement with respect thereto, and wherein each said secondary carriage assembly further comprises a positioning knob secured in rigid combination with said spring-loaded scribe head, said positioning knob being operative to move said spring-loaded scribe head between a disengaged position for mounting said primary carriage assembly in movable combination with the sheath mold assembly and a scribe position wherein said hardened scriber affixed in combination with said spring-loaded scribe head is operative to scribe the trim line in the oversized, cured leading-edge sheath.

5. The EOP scribe device of claim 1 wherein each said spring-loaded scribe head further comprises a tolerance roller rotatably mounted in combination therewith, said tolerance roller is operative to rotatably engage the oversized, cured leading-edge sheath during the spanwise translation of said primary carriage assembly along the sheath mold assembly to maintain a constant depth for the scribed trim line.

6. The EOP scribe device of claim 1 further comprising V-groove rollers affixed in combination with said primary carriage assembly and interactively operative in combination with the sheath mold assembly to facilitate the spanwise translation of said primary carriage assembly along the sheath mold assembly.

7. The EOP scribe device of claim 1 further comprising a plurality of handles affixed in combination with said primary carriage assembly.

8. An edge-of-part (EOP) scribe device for scribing trim lines in exposed segments of an oversized, cured leading-edge sheath mounted on a sheath mold assembly wherein the scribed trim lines correspond to profiles of finished edges of a prefabricated leading-edge sheath, comprising:

a primary carriage assembly mounted in movable combination with the sheath mold assembly for spanwise translation therealong;

opposed pairs of guide rails affixed in combination with said primary carriage assembly;

a secondary carriage assembly mounted in movable combination with each said pair of guide rails, each said secondary carriage assembly including a spring-loaded scribe head mounted in movable combination with said secondary carriage assembly for transverse movement with respect thereto, said spring-loaded scribe head including a hardened scriber rigidly affixed in combination therewith, and a tolerance roller rotatably mounted in combination therewith, a positioning knob affixed in rigid combination with said spring-loaded scribe head, said positioning knob being operative to move said spring-loaded scribe head between a disengaged position for mounting said primary carriage assembly in movable combination with the sheath mold assembly and a scribe position wherein said hardened scriber affixed in combination with said spring-loaded scribe head is operative to scribe a trim line in the oversized, cured leading-edge sheath, a rigid follower linkage affixed in combination with said secondary carriage assembly; and a follower slide roller rotatably mounted in combination with said rigid follow linkage; and profile means disposed in combination with the sheath mold assembly for defining the profile of one finished edge of the prefabricated leading edge sheath; and wherein said follower slide roller rotatably engages said profile meads and is operative to rotatably track said profile means wherein dimensional changes in said profile means induce vertical displacements in said follower slide roller to cause synchronous vertical displacements in said secondary carriage assembly that correspond to profile of the one finished edge of the prefabricated leading-edge sheath as a result of the spanwise translation of said primary carriage assembly along the sheath mold assembly;

said hardened scribers being operative in said scribe position to scribe the trim lines in the exposed surfaces of the oversized, cured leading-edge sheath during the spanwise translation of said primary carriage assembly along the sheath mold assembly, said scribed trim lines corresponding to the profiles of the finished edges of the prefabricated leading-edge sheath due to the vertical displacements induced in said secondary carriage assemblies;

said tolerance roller being operative to rotatably engage the oversized, cured leading-edge sheath during the spanwise translation of said primary carriage assembly along the sheath mold assembly to maintain a constant depth for the trim lines scribed by said hardened scribers.

9. The EOP scribe device of claim 8 wherein said profile means comprises trim line templates affixed in combination with the sheath mold assembly on opposed sides thereof, said trim line templates having profiled edges that define the profiles of the finished edges of the prefabricated leading-edge sheath, and wherein said follower slide rollers rotatably engage said profiled edges of said trim line templates such that dimensional changes in said profiled edges during the spanwise translation of said primary carriage assembly along the sheath mold assembly induce corresponding vertical displacements in said follower slide rollers.

10. The EOP scribe device of claim 8 further comprising V-groove rollers affixed in combination with said primary carriage assembly and interactively operative in combination with the sheath mold assembly to facilitate the spanwise translation of said primary carriage assembly along the sheath mold assembly.

11. A method for scribing trim lines in an oversized, cured leading-edge sheath mounted on a sheath mold assembly, the sheath mold assembly including side rails and trim line template plates affixed in combination with the sheath mold assembly on opposed sides thereof, the trim line templates having profiled edges that define profiles of finished edges of a prefabricated leading-edge sheath, comprising the steps of:

providing an edge-of-part scribe device comprising a primary carriage assembly mounted in movable combination with the sheath mold assembly, V-groove rollers affixed in combination with said primary carriage assembly, opposed pairs of guide rails affixed in combination with said primary carriage assembly, a secondary carriage assembly mounted in movable combination with each said pair of guide rails, each said secondary carriage assembly including a spring-loaded scribe head mounted in movable combination with said secondary carriage assembly and including a hardened scriber rigidly affixed in combination therewith, a positioning knob affixed in combination with said spring-loaded scribe head and operative to move said spring-loaded scribe head between a disengaged position and a scribe position, a rigid follower linkage rigidly affixed in combination with said secondary carriage assembly, and a follower slide roller rotatably mounted in combination with said rigid follower linkage;

ensuring that said spring-loaded scribe heads are in the disengaged position;

mounting said primary carriage assembly in movable combination with the sheath mold assembly for spanwise translation with respect thereto wherein said follower slide roller rotatably engage the profiled edges of the trim line templates;

actuating said positioning knobs to position said spring-loaded scribe heads in the scribe position;

translating said primary carriage assembly spanwise along the sheath mold assembly wherein said hardened scribers in said scribe position are operative to scribe trim lines in the oversized, cured leading-edge sheath corresponding to the profiles of the finished edges of the prefabricated leading-edge sheath;

actuating said positioning knobs to position said spring-loaded scribe heads in the disengaged position; and dismounting the EOP scribe device from the sheath mold assembly.

12. The method of claim 11 wherein said mounting step comprises the substeps of:

inserting one pair of V-groove rollers in rolling combination with the side rails of the sheath mold assembly;

sliding the follower slide rollers onto the respective profile edges of the trim line templates such that said follower slide rollers are in rotatable engagement therewith; and inserting the other pair of V-groove rollers in rolling combination with the side rails of the sheath mold assembly.

* * * * *